United States Patent
Potrebic et al.

(10) Patent No.: US 7,394,967 B1
(45) Date of Patent: Jul. 1, 2008

(54) RECORDED CONTENT MANAGEMENT

(75) Inventors: Peter J. Potrebic, Calistoga, CA (US);
Bruce A. Leak, Los Altos, CA (US);
David J. Cheng, Cupertino, CA (US);
Shannon B. Vosseller, San Francisco, CA (US); Marcus Tai-Tong Aiu, Palo Alto, CA (US)

(73) Assignee: Microsoft Corporation, Redmond, WA (US)

(*) Notice: Subject to any disclaimer, the term of this patent is extended or adjusted under 35 U.S.C. 154(b) by 1229 days.

(21) Appl. No.: 10/186,215

(22) Filed: Jun. 27, 2002

(51) Int. Cl.
H04N 5/76 (2006.01)
H04N 7/00 (2006.01)
H04N 5/00 (2006.01)

(52) U.S. Cl. ........................ 386/46; 386/125
(58) Field of Classification Search ............... 386/46, 386/83, 117; 725/58
See application file for complete search history.

(56) References Cited

U.S. PATENT DOCUMENTS

| | | | | |
|---|---|---|---|---|
| 5,361,173 A * | 11/1994 | Ishii et al. | ...... | 360/27 |
| 5,400,402 A * | 3/1995 | Garfinkle | ...... | 380/231 |
| 5,444,499 A * | 8/1995 | Saitoh | ...... | 348/734 |
| 5,585,865 A * | 12/1996 | Amano et al. | ...... | 725/14 |
| 5,761,371 A * | 6/1998 | Ohno et al. | ...... | 386/46 |
| 5,861,906 A | 1/1999 | Dunn et al. | | |
| 6,025,868 A * | 2/2000 | Russo | ...... | 725/104 |
| 6,614,987 B1 * | 9/2003 | Ismail et al. | ...... | 386/83 |
| 6,642,939 B1 * | 11/2003 | Vallone et al. | ...... | 715/721 |
| 6,670,971 B1 * | 12/2003 | Oral | ...... | 715/769 |
| 6,727,914 B1 * | 4/2004 | Gutta | ...... | 715/719 |
| 6,760,535 B1 * | 7/2004 | Orr | ...... | 386/46 |
| 6,920,281 B1 * | 7/2005 | Agnibotri et al. | ...... | 386/125 |
| 7,039,928 B2 * | 5/2006 | Kamada et al. | ...... | 725/9 |
| 7,243,364 B2 * | 7/2007 | Dunn et al. | ...... | 725/93 |
| 2002/0087997 A1 * | 7/2002 | Dahlstrom | ...... | 725/89 |
| 2002/0143782 A1 * | 10/2002 | Headings et al. | ...... | 707/100 |
| 2002/0174430 A1 * | 11/2002 | Ellis et al. | ...... | 725/46 |
| 2003/0053792 A1 * | 3/2003 | Janevski | ...... | 386/46 |
| 2003/0099456 A1 * | 5/2003 | Ohmura et al. | ...... | 386/46 |
| 2004/0210932 A1 * | 10/2004 | Mori et al. | ...... | 725/39 |
| 2005/0120366 A1 * | 6/2005 | Thurbon | ...... | 725/9 |
| 2005/0138659 A1 * | 6/2005 | Boccon-Gibod et al. | ...... | 725/58 |

FOREIGN PATENT DOCUMENTS

JP 2000196979 A * 7/2000

OTHER PUBLICATIONS

Yeung, Chung-Sheng and Lienhart, "Storage and Retrieval for Media Databases 2001", SPIE—The International Society for Optical Engineering, Jan. 2001, pp. 311-319.

* cited by examiner

*Primary Examiner*—Thai Tran
*Assistant Examiner*—Gelek Topgyal

(57) ABSTRACT

A recorded content management system determines when recorded content maintained in a television-based entertainment and information system has been watched by a viewer. When a segment or percentage of the recorded content for a particular program is displayed for viewing, it is determined whether the program has been watched so that the recorded content, or a portion of the recorded content, can be queued for deletion, or maintained for additional viewing.

57 Claims, 6 Drawing Sheets

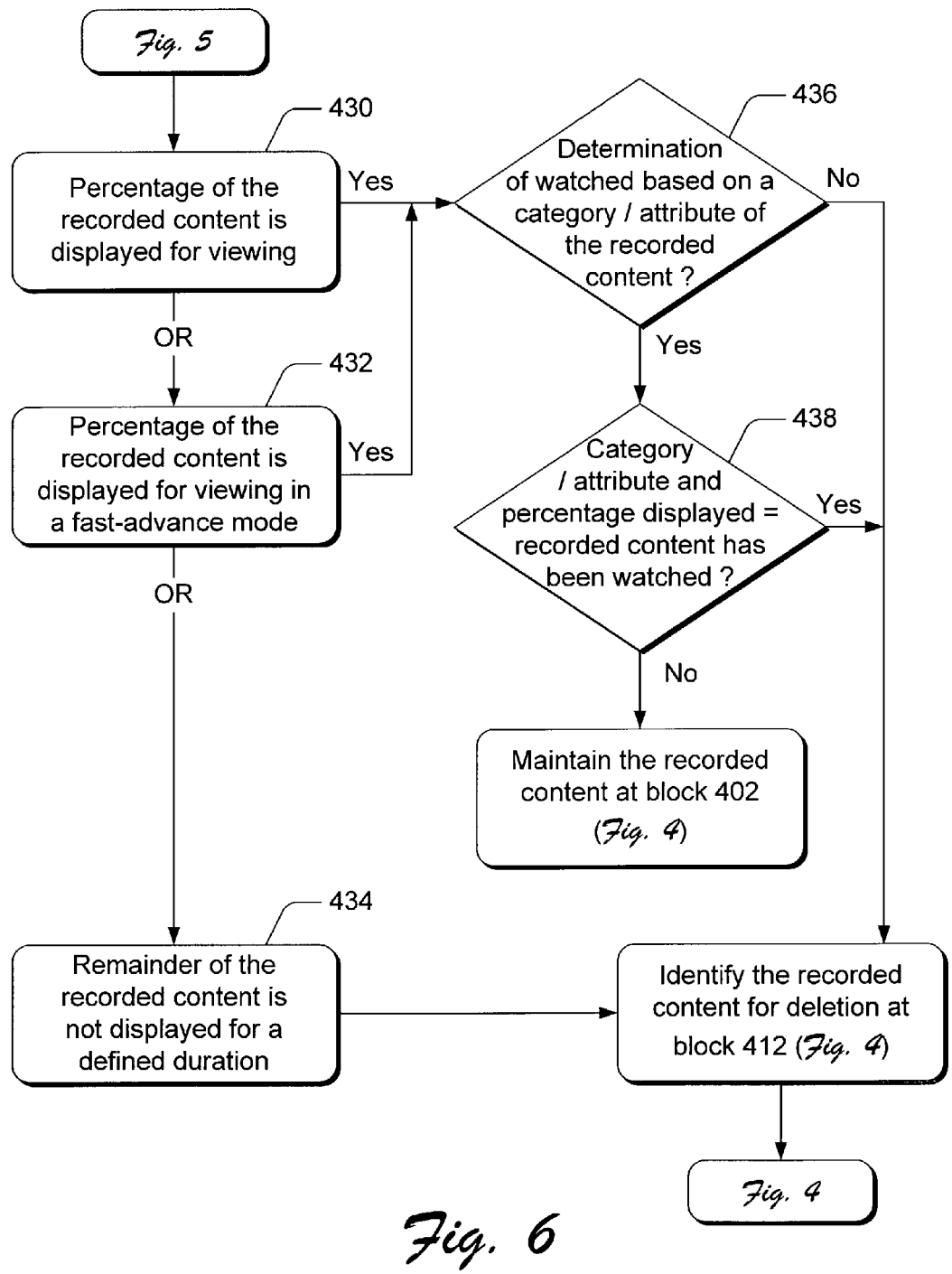

RECORDED CONTENT MANAGEMENT

TECHNICAL FIELD

This invention relates to television-based entertainment and information architectures and, in particular, to recorded content management.

BACKGROUND

A client device, such as a digital video recorder or a personal video recorder, can receive video content in the form of broadcast and/or interactive television entertainment and information, and in the form of on-demand entertainment, such as movies. A digital or personal video recorder includes a hard disk memory so that a viewer can record the video content and other content of interest to the viewer. The hard disk memory in digital or personal video recorder has limited space to store the video content for future reference by a viewer.

A hard disk memory in a digital or personal video recorder system is managed to keep recorded programs, such as movies and television shows, that a viewer wants to save for viewing at a later time. The hard disk memory is also managed to delete video content from the hard disk memory to provide memory resources for recording new or additional video content. Conventional video recorder systems keep recorded video content until memory space is needed to record additional video content, or for a defined period of time.

However, conventional video recorder systems do not manage recorded content based on the many different ways in which viewers watch recorded programs. A viewer may want to ensure that a program is not deleted until the program has been watched, and only then have the program deleted as memory resources are needed. Further, a viewer may watch only a portion of a program intending to watch the remainder of the program, or another portion of the program, at a later time. Again, the viewer may want to ensure that the program is not deleted until after having watched other portions of the program.

Accordingly, for television-based entertainment and information systems, there is a need for recorded content management policies that correspond with the many different ways in which viewers watch recorded programs.

SUMMARY

A recorded content management system determines when recorded content maintained in a television-based entertainment and information system has been watched by a viewer. When a segment or percentage of recorded content for a particular program is displayed for viewing (e.g., watched by a viewer), it is determined whether the program has been watched so that the recorded content, or a portion of the recorded content, can be queued for deletion, or saved for additional viewing at a later time. In an implementation, factors such as which segment, or segments, of the recorded content has been displayed for viewing, what overall percentage of the recorded content has been displayed for viewing, a category of the recorded content, and program attributes can be considered individually and/or in combination to determine whether a program has been watched.

BRIEF DESCRIPTION OF THE DRAWINGS

The same numbers are used throughout the drawings to reference like features and components.

FIGS. 4, 5, and 6 illustrate a flow diagram of a method for recorded content management.

DETAILED DESCRIPTION

A recorded content management system is described that determines when recorded content maintained with a memory device in a television-based entertainment and information system has been watched by a viewer. When a segment or percentage of the recorded content for a particular program is displayed for viewing (e.g., watched by a viewer), it is determined whether the program has been "watched" so that the recorded content can be queued for deletion, or saved for additional viewing at a later time.

The recorded content management system implements policies that correspond with the many different ways in which viewers watch recorded programs, and implements the policies to keep or maintain a recorded program until it is determined that the recorded program has been watched, or until a viewer directs that the program be deleted. After a program is determined to have been watched, the program, or a portion of the program, is then maintained while recording disk drive space is available and is deleted when space is needed to record additional content.

Whether a program has been watched can be determined based on factors that include which segment, or segments, of the recorded content has been displayed for viewing, such as a beginning segment or an end segment, what overall percentage of the recorded content has been displayed for viewing, a category of the recorded content, attributes of the program, and/or any number of other factors that can be considered individually and/or in combination to determine whether the program has been watched.

The following discussion is directed to television-based entertainment and information systems, such as interactive TV networks, cable networks that utilize electronic program guides, and Web-enabled TV networks. Client devices in such systems range from full-resource clients with substantial memory and processing resources, such as TV-enabled personal computers and TV recorders equipped with hard-disks, to low-resource clients with limited memory and/or processing resources, such as traditional set-top boxes. While aspects of the described systems and methods can be used in any of these systems and for any types of client devices, they are described in the context of the following exemplary environment.

Exemplary System Architecture

Figure 1:
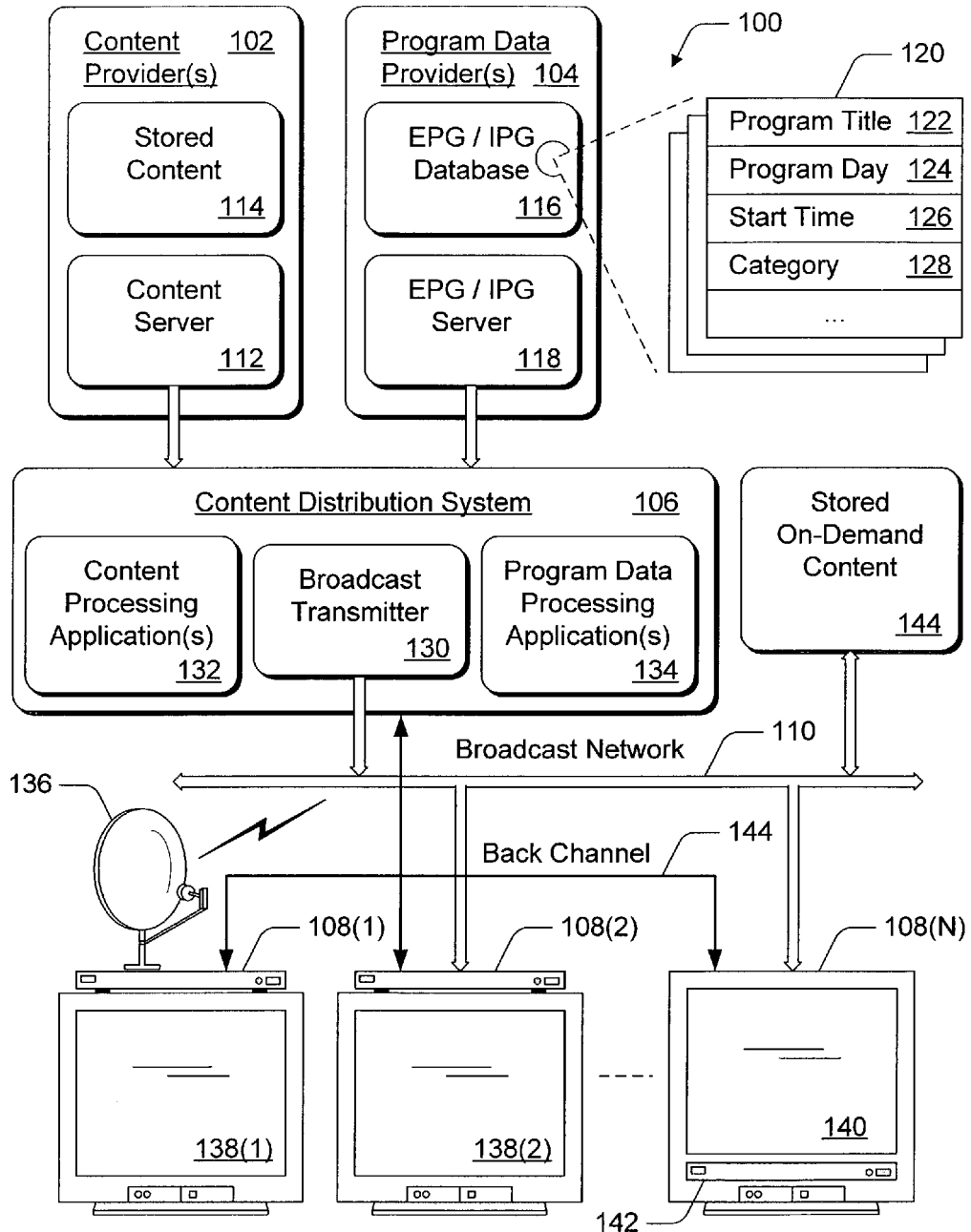
FIG. 1 illustrates an exemplary system architecture in which the systems and methods for recorded content management can be implemented.

FIG. 1 illustrates an exemplary television entertainment system 100 that is an architecture in which recorded content management can be implemented. System 100 facilitates distribution of content and program data to multiple viewers, and includes components to further facilitate recorded content management policies. The system 100 includes one or more content providers 102, one or more program data providers 104, a content distribution system 106, and multiple client devices 108(1), 108(2), . . . , 108(N) coupled to the content distribution system 106 via a broadcast network 110.

Content provider 102 includes a content server 112 and stored content 114, such as movies, television programs, commercials, music, and similar audio and/or video content.

Content server 112 controls distribution of the stored content 114 from content provider 102 to the content distribution system 106. Additionally, content server 112 controls distribution of live content (e.g., content that was not previously stored, such as live feeds) and/or content stored at other locations to the content distribution system 106. Program data provider 104 includes an electronic program guide (EPG) and/or interactive program guide (IPG) database 116 and an EPG and/or IPG server 118. The program guide database 116 stores electronic files of program data which is used to generate an electronic or interactive program guide (or, "program guide").

An electronic file maintains program data 120 (or, "EPG data", or "IPG data") that may include a program title 122, program broadcast day(s) 124 to identify which days of the week the program will be shown, program start times(s) 126 to identify a time that the program will be shown on the particular day or days of the week, and a program category 128. A program category describes the genre of a program and categorizes it as a particular program type. For example, a program can be categorized as a movie, a comedy, a sporting event, a news program, a sitcom, a talk show, or as any number of other category descriptions. Program data can also include program ratings, characters, descriptions, actor names, station identifiers, channel identifiers, schedule information, and so on. Additionally, program data may include video on-demand content information, such as movie schedules, as well as application information, such as for interactive games, and other programming information that may be of interest to a viewer.

The program guide server 118 processes the program data prior to distribution to generate a published version of the program data which can contain programming information for all broadcast channels and on-demand content listings for one or more days. The processing may involve any number of techniques to reduce, modify, or enhance the program data. Such processes might include selection of content, content compression, format modification, and the like. The program guide server 118 controls distribution of the published version of the program data from program data provider 104 to the content distribution system 106 using, for example, a file transfer protocol (FTP) over a TCP/IP network (e.g., Internet or Intranet). Further, the published version of the program data can be transmitted from program data provider 104 via a satellite and the content distribution system 106 directly to a client device 108.

Content distribution system 106 includes a broadcast transmitter 130, one or more content processing applications 132, and one or more program data processing applications 134. Broadcast transmitter 130 broadcasts signals, such as cable television signals, across broadcast network 110. Broadcast network 110 can include a cable television network, RF, microwave, satellite, and/or data network, such as the Internet, and may also include wired or wireless media using any broadcast format or broadcast protocol. Additionally, broadcast network 110 can be any type of network, using any type of network topology and any network communication protocol, and can be represented or otherwise implemented as a combination of two or more networks.

A content processing application 132 processes the content received from content provider 102 prior to transmitting the content across broadcast network 110. Similarly, a program data processing application 134 processes the program data received from program data provider 104 prior to transmitting the program data across broadcast network 110. A particular content processing application 132 may encode, or otherwise process, the received content into a format that is understood by the multiple client devices 108(1), 108(2), . . . , 108(N) coupled to broadcast network 110. Although FIG. 1 shows a single content provider 102, a single program data provider 104, and a single content distribution system 106, exemplary system 100 can include any number of content providers and/or program data providers coupled to any number of content distribution systems.

Content distribution system 106 is representative of a headend service that provides EPG and/or IPG data, as well as content, to multiple subscribers. Each content distribution system 106 may receive a slightly different version of the program data that takes into account different programming preferences and lineups. The program guide server 118 can create different versions of an electronic or interactive program guide that includes those channels of relevance to respective headend services, and the content distribution system 106 transmits the electronic or interactive program guide data to the multiple client devices 108(1), 108(2), . . . , 108(N). In one implementation, for example, content distribution system 106 utilizes a carousel file system to repeatedly broadcast the program data over an out-of-band (OOB) channel to the client devices 108. Alternatively, the multiple client devices 108(1), 108(2), . . . , 108(N) can receive standard, or uniform, program data and individually determine the program data to display based on the associated headend service.

Client devices 108 can be implemented in a number of ways. For example, a client device 108(1) receives broadcast content from a satellite-based transmitter via a satellite dish 136. Client device 108(1) is also referred to as a set-top box or a satellite receiving device. Client device 108(1) is coupled to a television 138(1) for presenting the content received by the client device (e.g., audio data and video data), as well as a graphical user interface. A particular client device 108 can be coupled to any number of televisions 138 and/or similar devices that can be implemented to display or otherwise render content. Similarly, any number of client devices 108 can be coupled to a single television 138.

Client device 108(2) is also coupled to receive broadcast content from broadcast network 110 and provide the received content to associated television 138(2). Client device 108(N) is an example of a combination television 140 and integrated set-top box 142. In this example, the various components and functionality of the set-top box are integrated into the television, rather than using two separate devices. The set-top box integrated into the television can receive broadcast signals via a satellite dish (similar to satellite dish 136) and/or via broadcast network 110. In alternate implementations, client devices 108 may receive broadcast signals via the Internet or any other broadcast medium, such as back channel 144 which can be implemented as a Internet protocol (IP) connection or as other protocol connections using a modem connection and conventional telephone line, for example. Further, back channel 144 provides an alternate communication link between each of the client devices 108, and between the client devices 108 and the content distribution system 106.

Each client device 108 can run an electronic or interactive program guide (EPG or IPG) application that utilizes the program data. A program guide application enables a television viewer to navigate through an onscreen program guide and locate television shows, video on-demand movies, interactive game selections, and other media access information or content of interest to the viewer. With a program guide application, the television viewer can look at schedules of current and future programming, set reminders for upcoming programs, and/or enter instructions to record one or more television shows or video on-demand movies.

The exemplary system 100 also includes stored on-demand content 144, such as Video On-Demand (VOD) movie content. The stored on-demand content can be viewed with a television 138 via a client device 108 through an onscreen movie guide, for example, and a viewer can enter instructions to stream a particular movie, or other stored content, down to a corresponding client device 108.

Exemplary Client Device

Figure 2:
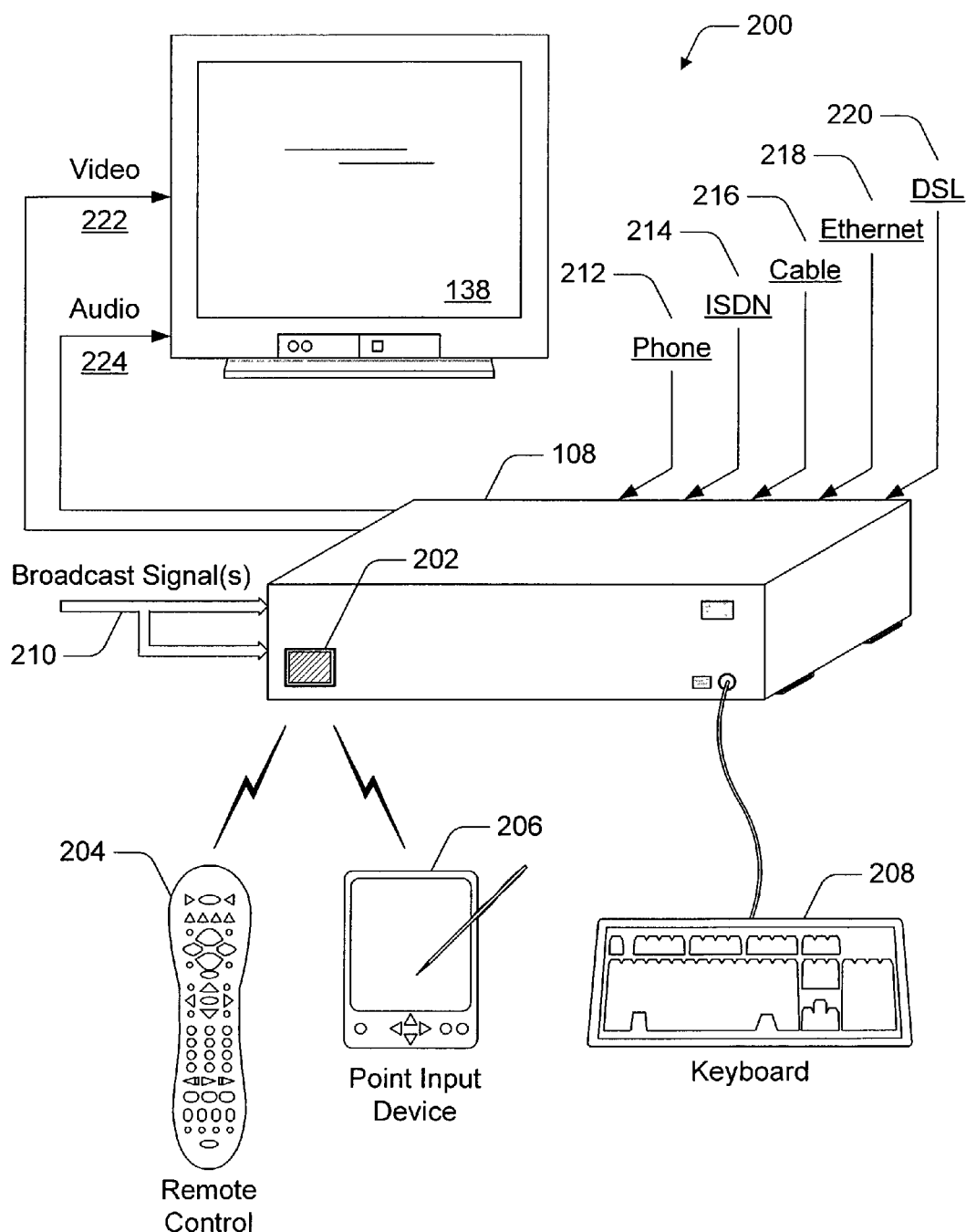
FIG. 2 illustrates an example client device, a television, and various input devices that interact with the client device.

FIG. 2 illustrates an exemplary implementation 200 of a client device 108 shown as a standalone unit that connects to a television 138. Client device 108 can be implemented in any number of embodiments, including as a set-top box, a satellite receiver, a TV recorder with a hard disk, a digital video recorder (DVR) and playback system, a personal video recorder (PVR) and playback system, a game console, an information appliance, and so forth.

Client device 108 includes a wireless port 202, such as an infrared (IR), 802.11, or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 can be coupled to communicate with client device 108. In alternate embodiments, remote control device 204, handheld device 206, and/or keyboard 208 may use an RF communication link or other mode of transmission to communicate with client device 108.

Client device 108 receives one or more broadcast signals 210 from one or more broadcast sources, such as from a satellite or from a broadcast network, such as broadcast network 110 (FIG. 1). Client device 108 includes hardware and/or software for receiving and decoding broadcast signal 210, such as an NTSC, PAL, SECAM, or other television system analog video signal, as well as a DVB, ATSC, or other television system digital video signal. Client device 108 also includes hardware and/or software for providing the user with a graphical user interface by which the user can, for example, access various network services and applications, configure the client device 108, and perform other functions.

Client device 108 can communicate with other devices via one or more connections including an 802.11 wireless transport via wireless connection 202, a conventional telephone line 212, an ISDN link 214, a cable link 216, an Ethernet link 218, a DSL link 220, and the like. Client device 108 may use any one or more of the various communication links 202 and 212-220 at a particular instant to communicate with any number of other devices.

Client device 108 generates video signal(s) 222 and audio signal(s) 224, both of which are communicated to television 138, and/or to other video or audio rendering devices, such as a stereo system or other digital audio device. The video signals and audio signals can be communicated from client device 108 to television 138 via an RF (radio frequency) link, S-video link, composite video link, component video link, or other communication link. Although not shown in FIG. 2, client device 108 may include one or more lights or other indicators identifying the current status of the device. Additionally, the client device may include one or more control buttons, switches, or other selectable controls for controlling operation of the device.

Exemplary Recorded Content Management System

Figure 3:
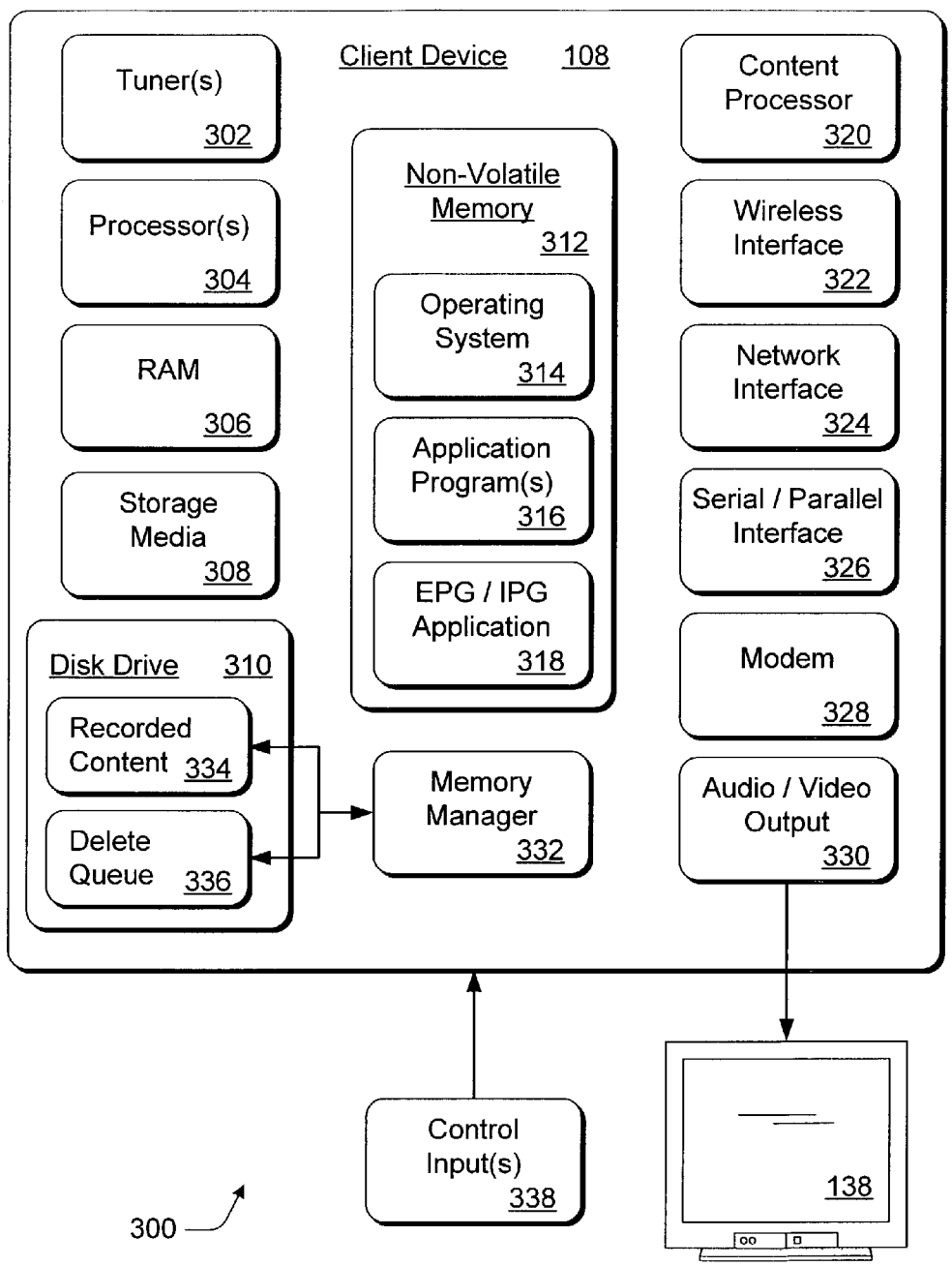
FIG. 3 illustrates various components of an exemplary client device implemented in a recorded content management system.

FIG. 3 illustrates an exemplary recorded content management system 300 that includes selected components of television system 100, such as an exemplary client device 108 as shown in FIGS. 1 and 2, and a television 138. Client device 108 also includes components to implement recorded content management policies in a television-based entertainment and information system.

Client device 108 includes one or more tuners 302 which are representative of one or more in-band tuners that tune to various frequencies or channels to receive television signals, as well as an out-of-band tuner that tunes to the broadcast channel over which the program data is broadcast to client device 108. Client device 108 also includes one or more processors 304 (e.g., microprocessors) which process various instructions to control the operation of client device 108 and to communicate with other electronic and computing devices.

Client device 108 can be implemented with one or more memory components, examples of which include a random access memory (RAM) 306, mass storage media 308, a disk drive 310, and a non-volatile memory 312 (e.g., ROM, Flash, EPROM, EEPROM, etc.). The memory components (e.g., RAM 306, storage media 308, disk drive 310, and non-volatile memory 312) store various information and/or data such as received content, program data, configuration information for client device 108, and/or graphical user interface information.

Alternative implementations of client device 108 can include a range of processing and memory capabilities, and may include any number and different memory components than those illustrated in FIG. 3. For example, full-resource clients can be implemented with substantial memory and processing resources, including the disk drive 310. Low-resource clients, however, may have limited processing and memory capabilities, such as a limited amount of RAM 306 and limited processing capabilities of a processor 304.

An operating system 314 and one or more application programs 316 can be stored in non-volatile memory 312 and executed on a processor 304 to provide a runtime environment. A runtime environment facilitates extensibility of client device 108 by allowing various interfaces to be defined that, in turn, allow application programs 316 to interact with client device 108. The application programs 316 that may be implemented in client device 108 can include a browser to browse the Web (e.g., "World Wide Web"), an email program to facilitate electronic mail, and so on.

An EPG and/or IPG application 318 is stored in memory 312 to operate on the program data and generate a program guide. Client device 108 can also include other components pertaining to a television-based entertainment system which are not illustrated in this example. For instance, client device 108 can include a user interface application and user interface lights, buttons, controls, and the like to facilitate viewer interaction with the device.

Client device 108 also includes a content processor and/or decoder 320 to process and decode broadcast video signals, such as NTSC, PAL, SECAM, or other television system analog video signals, as well as a DVB, ATSC, or other television system digital video signals. Content processor 320 can also include a video decoder and/or additional processors to receive, decode, and/or process video content received from a network operator. A network operator is an implementation of content distribution system 106 (FIG. 1) which is representative of a headend service that provides program data, as well as content, to multiple subscribers (i.e., client devices 108). Content processor 320 may include an MPEG-2 or MPEG-4 (Moving Pictures Experts Group) decoder that decodes MPEG-encoded video content. MPEG-2 supports a variety of audio/video formats, including legacy TV, HDTV (high-definition television), DVD (digital versatile disc), and five-channel surround sound.

Typically, video content includes video data and audio data that corresponds to the video data. Content processor 320 generates video and/or display content that is formatted for display on display device 138, and generates decoded audio data that is formatted for broadcast by a broadcast device, such as one or more speakers (not shown) in display device 138. Content processor 320 can include a display controller (not shown) that processes the video and/or display content to display corresponding images on display device 138. A display controller can include a microcontroller, integrated circuit, and/or similar video processing component to process the images. It is to be appreciated that the systems and methods described herein can be implemented for any type of encoding format as well as for data and/or content streams that are not encoded.

Client device 108 further includes a wireless interface 322, a network interface 324, a serial and/or parallel interface 326, and a PSTN, DSL, or cable modem 328. Wireless interface 322 allows client device 108 to receive input commands and other information from a user-operated input device, such as from a remote control device or from another IR, 802.11, Bluetooth, or similar RF input device. Network interface 324 and serial and/or parallel interface 326 allows client device 108 to interact and communicate with other electronic and computing devices via various communication links. Although not shown, client device 108 may also include other types of data communication interfaces to communicate with other devices. For example, client device 108 can include a USB port to enable communication with an external memory component to store recorded content. Further, client device 108 can be implemented as a component of a distributed network to receive and communicate recorded content via one or more of the communication links. Modem 328 facilitates client device 108 communication with other electronic and computing devices via a conventional telephone line, a DSL connection, or a cable modem. Client device 108 also includes an audio and/or video output 330 that provides signals to television 138 or to other devices that process and/or display, or otherwise render, the audio and video data.

Client device 108 includes a memory manager 332 configured to perform several functions of a recorded content management system and is implemented to manage recorded content 334 and a delete queue 336, both of which are maintained in disk drive 310. Memory manager 332 can be implemented as a software component that executes on a processor 304 and is stored in non-volatile memory 312. Although memory manager 332 is illustrated and described as a single application configured to perform several functions, the memory manager 332 can be implemented as several component applications distributed to each perform one or more functions in a digital video recorder system, a personal video recorder system, and/or any other television-based entertainment and information system.

Recorded content 334 can include any form of video and/or audio content, and any type of a recorded program, such as a movie or television show, which has been recorded and is maintained in disk drive 310 until a viewer initiates that the recorded content be displayed for viewing. The delete queue 336 includes recorded content, such as the movie or the television program, that has been displayed for viewing and is scheduled to be deleted based on the availability of disk drive space to record additional content. It should be noted that although the delete queue 336 is illustrated as separate memory space of disk drive 310, the memory manager 332 can maintain a reference table, or other electronic reference system, to identify recorded content 334 for deletion without moving the recorded content to a delete queue.

A viewer can initiate a control input 338 such that the recorded content 334 be displayed for viewing. The memory manager 332 can receive viewer commands as control inputs 338, such as from viewer-operated remote control device 204, handheld device 206, and/or keyboard 208. The viewer-inputs can include video display commands such as record, fast-forward, rewind, pause, and the like. The input commands may be input via an RF, IR, Bluetooth, or similar communication link or other mode of transmission to communicate with memory manager 332.

When a viewer watches all of the recorded content for a particular program, such as a movie or television show, the recorded content can be queued for deletion in the delete queue 336. However, when only a segment or percentage of the recorded content for a particular program is displayed for viewing (e.g., watched by a viewer), memory manager 332 is implemented to determine whether the recorded content has been "watched" so that the recorded content, or a portion of the recorded content, can be identified for deletion, or determine whether a viewer will likely select to watch more of the program at a later time. The memory manager 332 can identify a portion of the recorded content that has been watched for deletion, and maintain a remainder of the recorded content for viewing at a later time. A viewer can initiate a control input 338 to define that portions or segments of a recorded program that have been watched can be deleted, while a remainder of the recorded program continue to be maintained.

The memory manager 332 determines whether the recorded content has been watched based on factors that include which segment, or segments, of the recorded content has been displayed for viewing, what overall percentage of the recorded content has been displayed for viewing, a category of the recorded content, attributes of a program represented by the recorded content, and/or any number of other factors that can be considered individually and/or in combination to determine whether the recorded content has been watched. The category of recorded content identifies the recorded content as a particular program type. For example, a program can be categorized as a movie, a comedy, a sporting event, a news program, or as any number of other category descriptions. A program can be further categorized according to a program attribute which may include descriptive information about the program such as whether the program is a season premiere or finale, a repeat of the program, a live recording, and the like.

In this described implementation, the memory manager 332 can be configured to determine that recorded content has been watched when:

Any segment, percentage, or duration of the recorded content has been displayed for viewing;

A beginning segment of the recorded content has been displayed for viewing;

A beginning segment of the recorded content has been displayed for viewing after a defined buffered interval, such as after the first five minutes of a program that a viewer has watched only to skip past the beginning commercials intending to return at a later time and watch the program;

An end segment of the recorded content has been displayed for viewing;

A beginning segment and an end segment of the recorded content have displayed for viewing;

A beginning segment, a mid segment, and an end segment of the recorded content have been displayed for viewing;

A beginning segment of a particular category and/or attribute of the recorded content has been displayed for viewing, such as a late night talk show when a viewer has watched the first few minutes of the program corresponding to the opening monologue;

An end segment of a particular category and/or attribute of the recorded content has been displayed for viewing, such as news program when a viewer has watched the last fifteen minute segment, or a sporting event when the viewer watches the end of a game to determine the outcome;

A beginning segment and an end segment of a particular category and/or attribute of the recorded content have been displayed for viewing, such as a late night talk show when a viewer has watched the first few minutes of the program corresponding to the opening monologue and some or all of the guest interviews at the end of the program;

A beginning segment, a mid segment, and an end segment of a particular category and/or attribute of the recorded content have been displayed for viewing, such as a movie when a viewer has watched some of each of the different segments of the movie, or a sporting event such as a hockey game when a viewer has watched a bit of the $1^{st}$ period, a bit of the $2^{nd}$ period, and a bit of the $3^{rd}$ period of the game;

A portion of an end segment of the recorded content has been displayed for viewing, such as if a viewer watches up to the last five minutes, last ten minutes, last ten percent, or any other measure of the portion of an end segment of a program;

A percentage of the recorded content has been displayed for viewing (e.g., any combination of segments or portions of the recorded content);

A percentage of a particular category and/or attribute of the recorded content has been displayed for viewing, such as when a viewer watches various segments and/or portions of a sporting event;

A percentage of the recorded content has been displayed for viewing in any combination of normal playback mode, pause mode, and fast-advance mode, to include fast-forward, rewind, and skip-ahead; and/or A segment or percentage of the recorded content is displayed for viewing and then the remainder of the recorded content is not displayed for a defined duration, such as for one week or after two weeks, for example.

These combinations of factors to determine whether recorded content has been watched can also be viewer selectable and/or customizable via an interface, for example, generated with a graphical user interface application program 316 and displayed on television 138. A viewer can select or customize the many combinations of determiners with control inputs 338 which are received by memory manager 332.

Although shown separately, some of the components of client device 108 may be implemented in an application specific integrated circuit (ASIC). Additionally, a system bus (not shown) typically connects the various components within client device 108. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Methods for Recorded Content Management

Methods for recorded content management may be described in the general context of computer-executable instructions performed by memory manager 332 in client device 108. Generally, computer-executable instructions include routines, programs, objects, components, data structures, and the like that perform particular functions or implement particular abstract data types. Methods for recorded content management may also be practiced in distributed computing environments where functions are performed by remote processing devices that are linked through a communications network. In a distributed computing environment, computer-executable instructions may be located in both local and remote computer storage media, including memory storage devices.

Figure 4:
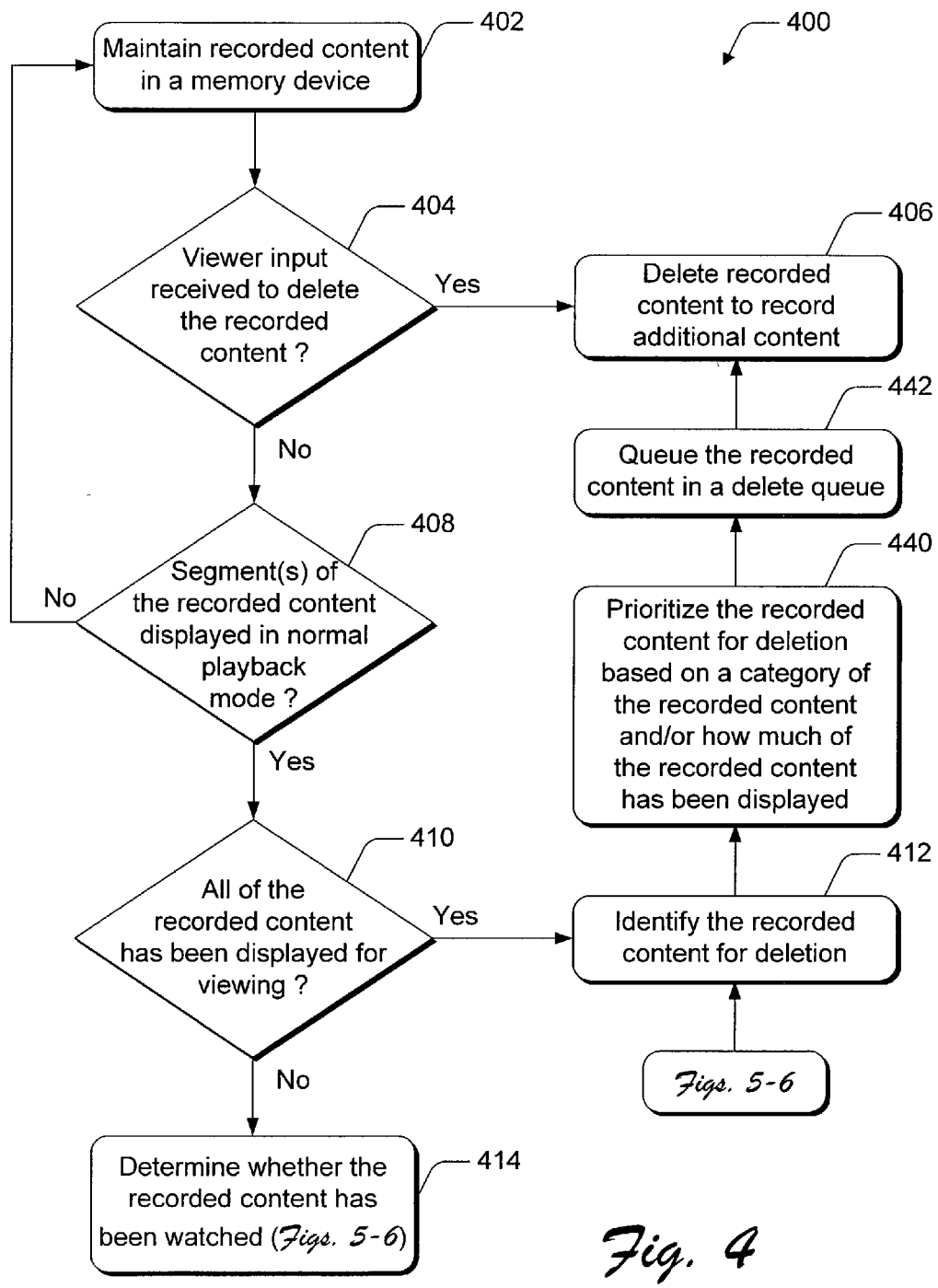

FIG. 4 illustrates a method 400 for recorded content management which can be implemented by memory manager 332 in client device 108, for example. The order in which the method is described is not intended to be construed as a limitation, and any number of the described method blocks can be combined in any order to implement the method. Furthermore, the method can be implemented in any suitable hardware, software, firmware, or combination thereof.

At block 402, recorded content is maintained in a memory device. For example, disk drive 310 in client device 108 maintains recorded content 334, such as programs that include a movie or television show, which can be selected by a viewer and displayed for viewing. At block 404, it is determined whether a viewer input to delete the recorded content has been received. For example, memory manager 332 in client device 108 can receive a control input 338 to delete the recorded content from disk drive 310.

If a viewer input is received to delete the recorded content (i.e., "yes" from block 404), the recorded content is deleted from the memory device at block 406. In this implementation, the recorded content is maintained in the memory device until a viewer either deletes the recorded content or watches the recorded content. The recorded content management policies described herein identify whether the recorded content has been watched by a viewer (e.g., displayed for viewing).

If a viewer input is not received to delete the recorded content (i.e., "no" from block 404), it is determined whether a segment, or segments, of the recorded content is displayed for viewing in a normal playback mode at block 408. A segment of the recorded content can include the beginning monologue segment of a late night talk show, a mid segment report of a news program, an end segment of a movie or sporting event, and/or any other portion of the recorded content, to include all of the recorded content of a program such as a movie or television show, for example. As used herein, "normal playback mode" is playback at a speed or rate at which a video program is normally viewed or normally played back for viewing (e.g., not fast-forward, slow-motion, or rewind).

If a segment of the recorded content is not displayed for viewing in a normal playback mode (i.e., "no" from block 408), the recorded content continues to be maintained at block 402. If a segment of the recorded content is displayed for viewing in a normal playback mode (i.e., "yes" from block 408), it is determined whether all of the recorded content has been displayed for viewing at block 410 (e.g., the segment of the recorded content displayed for viewing at block 408 is the entire movie or television show). If all of the recorded content has been displayed for viewing (i.e., "yes" from block 410), then the recorded content is identified for deletion at block 412. For example, memory manager 332 in client device 108 identifies recorded content 334 with a programming reference, or other reference identifier, to indicate that recorded content 334 can be deleted to free space in disk drive 310 for recording additional content.

If all of the recorded content has not been displayed for viewing (i.e., "no" from block 410), then it is determined whether the recorded content has been watched at block 414. When all of the recorded content for a particular program, such as a movie or television show, is not displayed for viewing, but rather only a segment of the recorded content is displayed in a normal playback mode (block 408), the memory manager 332 in client device 108 is implemented to determine whether the recorded content has been watched by a viewer so that the recorded content can be identified for deletion, or continues to be maintained.

Figure 5:
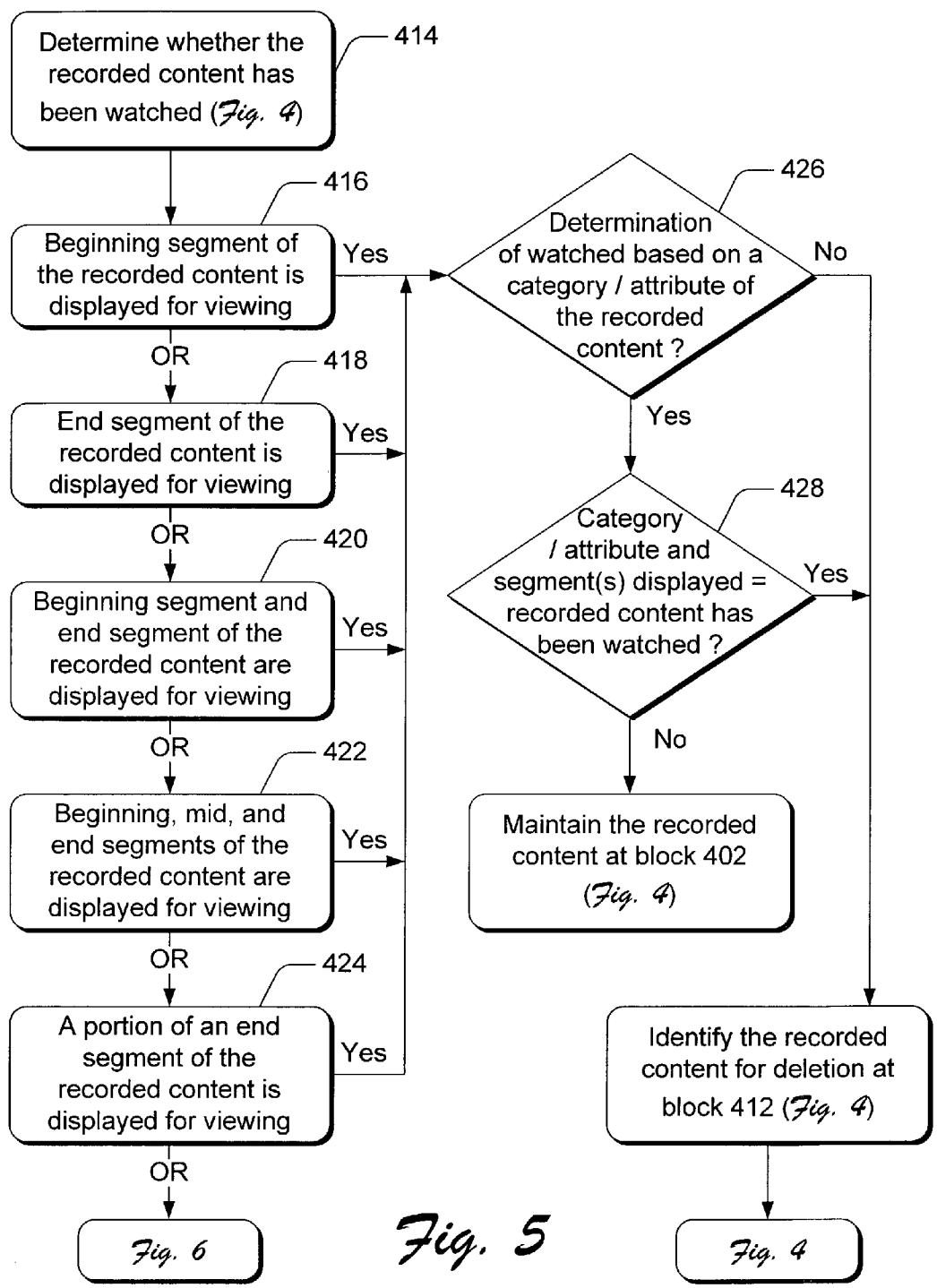

The memory manager 334 determines whether the recorded content has been watched based on factors that include which segment, or segments, of the recorded content has been displayed for viewing, what overall percentage of the recorded content has been displayed for viewing, the category of the recorded content, and/or other factors. FIGS. 5 and 6 continue with method 400, and determining whether the recorded content has been watched (block 414). Blocks 416 through 424 in FIG. 5 are each an alternative that references to block 408 (FIG. 4) in which a segment, or segments, of the recorded content is displayed in a normal playback mode.

At block 416, a beginning segment of the recorded content is displayed for viewing. Alternatively, at block 418, an end segment of the recorded content is displayed for viewing. Alternatively, at block 420, a beginning segment and an end segment of the recorded content is displayed for viewing. Alternatively, at block 422, a beginning segment, a mid segment, and an end segment of the recorded content is displayed for viewing. Alternatively, at block 424, a portion of an end segment of the recorded content is displayed for viewing.

At block 426, it is determined whether the basis for the recorded content being watched is based on a category of the recorded content and/or on an attribute of a program represented by the recorded content. The category and/or attribute basis for determining whether the recorded content was watched can be combined with displaying a beginning segment of the recorded content (block 416), an end segment of the recorded content (block 418), a beginning segment and an end segment of the recorded content (block 420), a beginning, mid, and end segment of the recorded content (block 422), and/or a portion of an end segment of the recorded content (block 424).

If the determination as to whether the recorded content was watched is not based on a category and/or an attribute of the recorded content (i.e., "no" from block 426), then the recorded content has been watched when displaying the segment, or segments, of the recorded content and the recorded content is identified for deletion at block 412 (FIG. 4). If the determination as to whether the recorded content was watched is based on a category and/or an attribute of the recorded content (i.e., "yes" from block 426), then it is determined whether a combination of the recorded content category and/or a program attribute, and displaying the segment, or segments, of the recorded content establishes that the recorded content has been watched at block 428.

If it is determined from the combination of the category and/or attribute and displaying the segment, or segments, that the recorded content has been watched (i.e., "yes" from block 428), then the recorded content is identified for deletion at block 412. If it is determined from the combination of the category and/or attribute and displaying the segment, or segments, that the recorded content has not been watched (i.e., "no" from block 428), then the recorded content continues to be maintained at block 402 (FIG. 4).

Blocks 430 through 432 in FIG. 6 are additional alternatives that reference to block 408 (FIG. 4) in which a segment, or segments, of the recorded content is displayed in a normal playback mode. At block 430, a percentage of the recorded content is displayed for viewing. The memory manager 332 in client device 108 (FIG. 3) can determine the percentage of a recorded content, such as movie, that has been displayed for viewing from a time duration that a segment of the recorded content has been displayed and a total time duration of the movie, for example. Alternatively, at block 432, a percentage of the recorded content is displayed for viewing in a fast-advance mode. This is in combination or in addition to the segment of recorded content displayed in a normal playback mode at block 408 (FIG. 4).

Alternatively, at block 434, a remainder of the content is not displayed for a defined duration. For example, a segment of the recorded content is displayed in a normal playback mode at block 408, or a percentage of the recorded content is displayed for viewing at block 430, and the remainder of the recorded content (segment or percentage) is not displayed for one week, two weeks, or any other defined duration which indicates that the viewer has watched all of the particular recorded content that will be watched. When the remainder of the content is not displayed for a defined duration, the recorded content is also identified for deletion at block 412 (FIG. 4).

At block 436, it is determined whether the basis for the recorded content being watched is based on a category of the recorded content and/or on an attribute of a program represented by the recorded content. The category and/or attribute basis for determining whether the recorded content was watched can be combined with displaying a percentage of the recorded content (block 430), and/or displaying a percentage of the recorded content in a fast-advance mode (block 432).

If the determination as to whether the recorded content was watched is not based on a category and/or an attribute of the recorded content (i.e., "no" from block 436), then the recorded content has been watched when displaying the percentage of the recorded content and the recorded content is identified for deletion at block 412 (FIG. 4). If the determination as to whether the recorded content was watched is based on a category and/or an attribute of the recorded content (i.e., "yes" from block 436), then it is determined whether a combination of the recorded content category and displaying the percentage of the recorded content establishes that the recorded content has been watched at block 438.

If it is determined from the combination of the category and/or attribute, and displaying the percentage that the recorded content has been watched (i.e., "yes" from block 438), then the recorded content is identified for deletion at block 412. If it is determined from the combination of the category and/or attribute, and displaying the percentage that the recorded content has not been watched (i.e., "no" from block 438), then the recorded content continues to be maintained at block 402 (FIG. 4).

When the recorded content is identified for deletion at block 412 in FIG. 4, the recorded content is prioritized for deletion based on a category, program attribute, and/or how much of the recorded content has been displayed at block 440. Prioritizing the recorded content for deletion based on a category, program attribute, and/or the quantity displayed is only one exemplary implementation. Alternatively, or in addition, prioritization can be based on the date that the content was recorded where earlier recordings are deleted first. Prioritization can also be based on any number of other program viewing and recording factors.

At block 442, the recorded content is queued in a delete queue. For example, memory manager 332 can identify recorded content 334 for deletion based on a category describing the recorded content, and queue the recorded content in the delete queue 336 based on which of the recorded content is to be deleted from disk drive 310 first, and which of the recorded content is to be maintained until the disk drive space is needed to record additional content. The recorded content corresponding to an entire program that has been watched can be placed in the delete queue ahead of recorded content corresponding to a program that only a short segment has been watched.

CONCLUSION

Although the invention has been described in language specific to structural features and/or methods, it is to be understood that the invention defined in the appended claims is not necessarily limited to the specific features or methods described. Rather, the specific features and methods are disclosed as preferred forms of implementing the claimed invention.

The invention claimed is:

1. A video recording system, comprising:
a memory device configured to maintain recorded video content corresponding to one or more programs; and
a memory manager configured to determine without user interaction whether a program maintained as recorded video content in the memory device has been watched, the memory manager further configured to identify that all of the program has been watched based on a genre of the program and after only a segment of the program has been displayed for viewing, the segment comprising less than all of the program.

2. A video recording system as recited in claim 1, wherein the memory manager is further configured to receive a viewer input to display the segment of the program for viewing.

3. A video recording system as recited in claim 1, wherein the memory manager is further configured to receive a viewer input to display the program for viewing, and determine that the program has been watched if the program is maintained in the memory device as a viewer-defined recorded program.

4. A video recording system as recited in claim 1, wherein the segment of the program includes an end segment of the program, and wherein the memory manager further determines that all of the program has been watched if the end segment of the program is displayed for viewing at a normal playback speed.

5. A video recording system as recited in claim 1, wherein the segment of the program includes a portion of an end segment of the program, and wherein the memory manager further determines that all of the program has been watched if the portion of the end segment of the program is displayed for viewing at a normal playback speed.

6. A video recording system as recited in claim 1, wherein the memory manager further determines that all of the program has been watched if the segment of the program is displayed for viewing at a normal playback speed, and if a remainder of the program is not displayed for viewing for a defined duration.

7. A video recording system as recited in claim 1, wherein the memory manager further determines that all of the program has been watched if a percentage of the program has been displayed for viewing at a normal playback speed.

8. A video recording system as recited in claim 1, wherein the memory manager further determines that all of the program has been watched if a percentage of the program has been displayed in at least one of a normal playback mode or a fast-advance mode.

9. A video recording system as recited in claim 1, wherein the memory manager further determines that all of the program has been watched if the program has been displayed in at least one of a normal playback mode, a fast-forward mode, a slow-advance mode, a rewind mode, or a pause mode.

10. A video recording system as recited in claim 1, wherein the segment of the program includes both a beginning segment of the program and an end segment of the program, and wherein the memory manager further determines that all of the program has been watched if the beginning segment of the program and the end segment of the program have been displayed for viewing at a normal playback speed.

11. A video recording system as recited in claim 1, wherein the segment of the program includes a beginning segment of the program, a mid segment of the program, and an end segment of the program, and wherein the memory manager further determines that all of the program has been watched if the beginning segment of the program, the mid segment of the program, and the end segment of the program have been displayed for viewing at a normal playback speed.

12. A video recording system as recited in claim 1, wherein the memory manager is further configured to queue the entire program for deletion after having determined that the program has been watched.

13. A video recording system as recited in claim 1, wherein the memory manager is further configured to queue the program for deletion after having determined that the program has been watched, and prioritize the program in a delete queue based on at least one of a category the genre of the program and an attribute of the program.

14. A video recording system as recited in claim 1, wherein the memory device is further configured to maintain the program until the memory manager receives a viewer input to delete the program from the memory device, and before the memory manager determines that the program has been watched.

15. A video recording system as recited in claim 1, wherein the memory device is further configured to maintain the program until memory space to record additional video content is needed after the memory manager determines that the program has been watched.

16. A television-based entertainment system comprising the video recording system as recited in claim 1.

17. A digital video recording system comprising the video recording system as recited in claim 1.

18. A personal video recording system comprising the video recording system as recited in claim 1.

19. A content recording system, comprising:
a memory device configured to maintain content for display until the content has been watched; and
a memory manager configured to identify without user interaction the content for deletion from the memory device if the content has been watched, the content determined to have been watched after less than all of the program has been displayed for viewing based on a genre of the content and a segment of the content displayed for viewing at a normal playback speed.

20. A content recording system as recited in claim 19, wherein the segment is an end segment of the content, and wherein the memory manager is further configured to determine that the content has been watched if the end segment of the content is displayed for viewing at a normal playback speed.

21. A content recording system as recited in claim 19, wherein the memory manager is further configured to determine that the content has been watched if a beginning segment of the content is displayed for viewing at a normal playback speed.

22. A content recording system as recited in claim 19, wherein the memory manager is further configured to determine that the content has been watched if the segment of the content is displayed for viewing at a normal playback speed, and if a remainder of the content is not displayed for viewing for a defined duration.

23. A content recording system as recited in claim 19, wherein the memory manager is further configured to determine that the content has been watched if a percentage of the content has been displayed for viewing at a normal playback speed.

24. A content recording system as recited in claim 19, wherein the memory manager is further configured to determine that the content has been watched if a percentage of the content has been displayed in at least one of a normal playback mode or a fast-advance mode.

25. A content recording system as recited in claim 19, wherein the memory manager is further configured to determine that the content has been watched if a beginning segment of the content and an end segment of the content have been displayed for viewing at a normal playback speed.

26. A content recording system as recited in claim 19, wherein the memory manager is further configured to determine that the content has been watched if a beginning segment of the content, a mid segment of the content, and an end segment of the content have been displayed for viewing at a normal playback speed.

27. A content recording system as recited in claim 19, wherein the memory manager is further configured to prioritize the content identified for deletion in a delete queue based on the genre of the content.

28. A television-based entertainment system comprising the content recording system as recited in claim 19.

29. A digital video recording system comprising the content recording system as recited in claim 19.

30. A personal video recording system comprising the content recording system as recited in claim 19.

31. A method for managing recorded content, comprising:
maintaining the recorded content until the recorded content has been watched;
determining that the all of the recorded content has been watched without user interaction based on a genre of the recorded content and when only a segment of the recorded content is displayed for viewing at a normal playback speed, the segment comprising less than all of the recorded content; and
identifying all of the recorded content for deletion when determining that the recorded content has been watched.

32. A method for managing recorded content as recited in claim 31, wherein the maintaining includes maintaining the recorded content until receiving a viewer input to delete the recorded content before determining that the recorded content has been watched.

33. A method for managing recorded content as recited in claim 31, wherein the maintaining includes maintaining the recorded content until memory space is needed to record additional content after determining that the recorded content has been watched.

34. A method for managing recorded content as recited in claim 31, wherein the identifying includes queuing the recorded content in a delete queue.

35. A method for managing recorded content as recited in claim 31, wherein the identifying includes prioritizing the recorded content in a delete queue based on at least one of the genre of the recorded content or an attribute of the recorded content.

36. A method for managing recorded content as recited in claim 31, wherein the segment of the recorded content includes an end segment of the recorded content.

37. A method for managing recorded content as recited in claim 31, wherein the segment of the recorded content includes a portion of an end segment of the recorded content.

38. A method for managing recorded content as recited in claim 31, wherein the determining includes determining that the recorded content has been watched if an end segment of the recorded content is displayed for viewing at a normal playback speed.

39. A method for managing recorded content as recited in claim 31, wherein the segment of the recorded content includes a beginning segment of the recorded content.

40. A method for managing recorded content as recited in claim 31, wherein the determining includes determining that a remainder of the recorded content is not displayed for viewing for a defined duration.

41. A method for managing recorded content as recited in claim 31, wherein the determining includes determining that the recorded content has been watched if a percentage of the recorded content has been displayed for viewing at a normal playback speed.

42. A method for managing recorded content as recited in claim 31, wherein the determining includes determining that the recorded content has been watched based on the genre of the recorded content and if a percentage of the recorded content has been displayed for viewing at a normal playback speed.

43. A method for managing recorded content as recited in claim 31, wherein the determining includes determining that the recorded content has been watched if a percentage of the recorded content has been displayed in at least one of a normal playback mode and a fast-advance mode.

44. A method for managing recorded content as recited in claim 31, wherein the segment of the recorded content includes both a beginning segment of the recorded content and an end segment of the recorded content.

45. A method for managing recorded content as recited in claim 31, wherein the segment of the recorded content includes a beginning segment of the recorded content, a mid segment of the recorded content, and an end segment of the recorded content.

46. One or more computer-readable media comprising computer-executable instructions that, when executed, direct a digital video recording system to perform the method of claim 31.

47. One or more computer-readable media comprising computer-executable instructions that, when executed, direct a personal video recording system to perform the method of claim 31.

48. A video recording system, comprising:
means for storing recorded video content;
means for rendering the recorded video content for display;
means for determining whether the recorded video content has been watched when displayed; and
means for identifying the recorded video content for deletion without user interaction if determining that a segment of the recorded video content has been watched and based on a genre of the recorded video content, the segment comprising less than all of the recorded video content.

49. A video recording system as recited in claim 48, further comprising means for categorizing the recorded video content when identifying the recorded video content for deletion.

50. One or more computer-readable media comprising computer-executable instructions that, when executed, direct a video recording system to:
   maintain recorded video content for display;
   determine whether the recorded video content has been watched based on a genre of the recorded video content and based on a segment of the recorded video content being displayed for viewing at a normal playback speed, the segment comprising less than all of the recorded video content; and
   identify the recorded video content for deletion if the recorded video content has been watched.

51. One or more computer-readable media as recited in claim 50, further comprising computer executable instructions that, when executed, direct the video recording system to determine that the recorded video content has been watched if an end segment of the recorded video content is displayed for viewing at a normal playback speed.

52. One or more computer-readable media as recited in claim 50, further comprising computer executable instructions that, when executed, direct the video recording system to determine that the recorded video content has been watched if a beginning segment of the recorded video content is displayed for viewing at a normal playback speed.

53. One or more computer-readable media as recited in claim 50, further comprising computer executable instructions that, when executed, direct the video recording system to determine that the recorded video content has been watched if a remainder of the recorded video content is not displayed for viewing for a defined duration.

54. One or more computer-readable media as recited in claim 50, further comprising computer executable instructions that, when executed, direct the video recording system to determine that the recorded video content has been watched if a percentage of the recorded video content has been displayed for viewing at a normal playback speed.

55. One or more computer-readable media as recited in claim 50, further comprising computer executable instructions that, when executed, direct the video recording system to determine that the recorded video content has been watched if a percentage of the recorded video content has been displayed in at least one of a normal playback mode or a fast-advance mode.

56. One or more computer-readable media as recited in claim 50, further comprising computer executable instructions that, when executed, direct the video recording system to determine that the recorded video content has been watched if a beginning segment of the recorded video content and an end segment of the recorded video content have been displayed for viewing at a normal playback speed.

57. One or more computer-readable media as recited in claim 50, further comprising computer executable instructions that, when executed, direct the video recording system to prioritize the recorded video content for deletion based on the genre of the recorded video content when the recorded video content is identified for deletion.

* * * * *